US009535645B2

(12) United States Patent
Suzuki

(10) Patent No.: US 9,535,645 B2
(45) Date of Patent: Jan. 3, 2017

(54) INFORMATION PROCESSING APPARATUS, INFORMATION PROCESSING METHOD, AND STORAGE MEDIUM FOR DISPLAYING ON A MULTI-DISPLAY SYSTEM BASED ON DISPLAY TYPE

(75) Inventor: Motohiro Suzuki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 327 days.

(21) Appl. No.: 13/595,909

(22) Filed: Aug. 27, 2012

(65) Prior Publication Data
US 2013/0050251 A1 Feb. 28, 2013

(30) Foreign Application Priority Data

Aug. 29, 2011 (JP) ................................ 2011-185967

(51) Int. Cl.
G06F 3/14 (2006.01)
G09G 5/14 (2006.01)

(52) U.S. Cl.
CPC .............. *G06F 3/1423* (2013.01); *G09G 5/14* (2013.01); *G09G 2330/026* (2013.01); *G09G 2340/0464* (2013.01); *G09G 2370/042* (2013.01)

(58) Field of Classification Search
CPC .............. G09G 5/00–5/006; G06F 3/14; G06F 11/1469; G06F 9/4401–9/442; G06F 1/3203
USPC ......................................... 345/530, 553, 556
See application file for complete search history.

(56) References Cited

U.S. PATENT DOCUMENTS

| 5,682,529 | A | * | 10/1997 | Hendry et al. ................. 713/100 |
| 5,745,669 | A | * | 4/1998 | Hugard ............... G06F 11/1417 |
| | | | | 714/3 |
| 6,006,335 | A | * | 12/1999 | Choi et al. ..................... 713/310 |
| 6,438,668 | B1 | * | 8/2002 | Esfahani et al. ............... 711/165 |
| 6,909,406 | B2 | * | 6/2005 | Wilburn et al. ................ 345/3.1 |
| 8,392,539 | B1 | * | 3/2013 | Chen et al. ..................... 709/220 |
| 2002/0059514 | A1 | * | 5/2002 | Hendry et al. ................. 713/100 |
| 2003/0214458 | A1 | * | 11/2003 | Giemborek et al. ........... 345/1.1 |
| 2004/0212610 | A1 | * | 10/2004 | Hamlin ........................ 345/211 |
| 2005/0091610 | A1 | * | 4/2005 | Frei et al. ..................... 715/804 |
| 2007/0086022 | A1 | * | 4/2007 | Kumagai ............ G06F 11/1451 |
| | | | | 358/1.1 |

(Continued)

FOREIGN PATENT DOCUMENTS

JP 2008-164988 A 7/2008
JP 2010267142 A 11/2010

OTHER PUBLICATIONS

Realtime Soft Ultramon, UltraMon, Jan. 2010, realtimesoft.com/ultramon, accessed Jun. 26, 2013.*

(Continued)

*Primary Examiner* — Michael J Cobb
(74) *Attorney, Agent, or Firm* — Canon U.S.A. Inc., IP Division

(57) ABSTRACT

An information processing apparatus stores identification information of an output apparatus connected to the information processing apparatus, stores display state information indicating a display state at the time of a stop of a system of the information processing apparatus, and controls restoration of the display state based on identification information of an external output apparatus connected to the information processing apparatus and the stored identification information in a case where the system is restarted after the stop of the system.

15 Claims, 7 Drawing Sheets

(56) References Cited

U.S. PATENT DOCUMENTS

| | | | |
|---|---|---|---|
| 2009/0161507 A1* | 6/2009 | Matsushita et al. | 369/47.5 |
| 2010/0040349 A1* | 2/2010 | Landy | 386/96 |
| 2010/0095077 A1* | 4/2010 | Lockwood | 711/162 |
| 2010/0262854 A1* | 10/2010 | Bridgwater et al. | 713/323 |
| 2011/0208955 A1* | 8/2011 | Anbazhagan et al. | 713/2 |
| 2013/0148720 A1* | 6/2013 | Rabii | G06F 3/1454 375/240.12 |
| 2014/0304643 A1* | 10/2014 | Holland et al. | G06F 3/0481 715/781 |
| 2016/0057090 A1* | 2/2016 | Faaborg | H04W 4/206 709/206 |

OTHER PUBLICATIONS

Dual-Monitor, Dual Monitor Hardware & Software, 2010, <<http://www.dual-monitor.biz/page/2/>>, accessed Mar. 27, 2016.*

Extron Electronics, Understanding EDID—Extended Display Identification Data, 2011, <<http://www.extron.com/company/article.aspx?id=uedid>>, accessed Mar. 22, 2016.*

Yahoo Answers, Re-Enable a Monitor in Windows 7?, 2010, <<https://answers.yahoo.com/question/index?qid=20100602114825AAOt3M2>>, accessed Mar. 27, 2016.*

Murgee, Monitor Control, 2010, <<http://www.murgee.com/MurGeeMon/monitor-control/>>, accessed Mar. 27, 2016.*

Murgee, Dual Monitor Software, 2010, <<http://www.murgee.com/MurGeeMon/>>, accessed Mar. 27, 2016.*

* cited by examiner

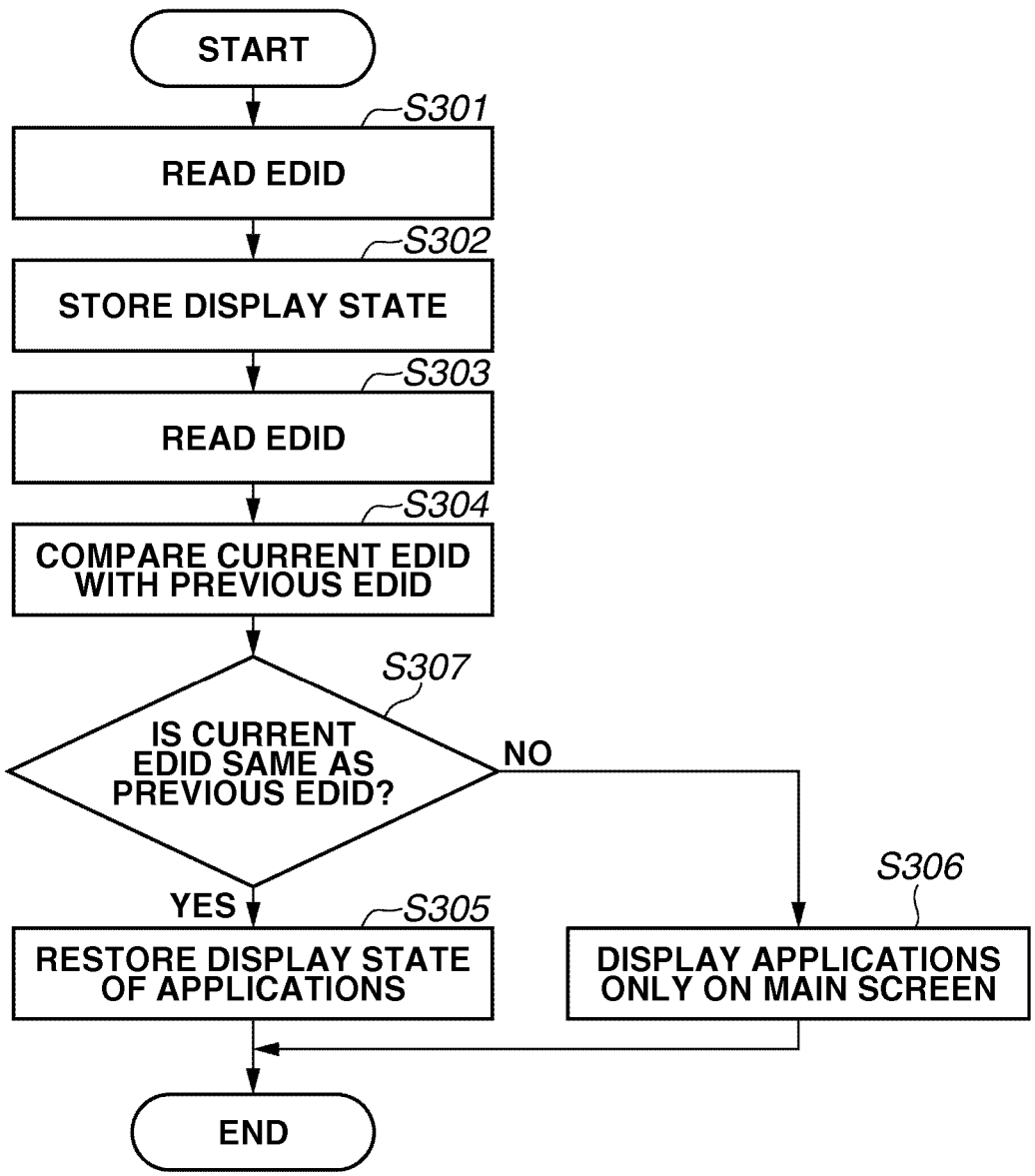

SCREEN PROJECTED BY LIQUID
CRYSTAL PROJECTOR 200

IMAGE DISPLAY UNIT 102

SCREEN PROJECTED BY LIQUID
CRYSTAL PROJECTOR 200

IMAGE DISPLAY UNIT 102

SCREEN PROJECTED BY LIQUID
CRYSTAL PROJECTOR 200

IMAGE DISPLAY UNIT 102

INFORMATION PROCESSING APPARATUS, INFORMATION PROCESSING METHOD, AND STORAGE MEDIUM FOR DISPLAYING ON A MULTI-DISPLAY SYSTEM BASED ON DISPLAY TYPE

This application claims priority from Japanese Patent Application No. 2011-185967 filed Aug. 29, 2011, which is hereby incorporated by reference herein in its entirety.

BACKGROUND OF THE INVENTION

Field of the Invention

The present invention relates to an information processing apparatus, an information processing method, and a storage medium.

Description of the Related Art

Some operation programs (hereinafter referred to as "OSs") provided with graphical user interfaces configured to be driven on, for example, information processing apparatuses, have a function of restoring a display state of an application program. According to this function, an OS stores a display state of an application program running when the OS is shut down, and restores the stored display state of the application when the OS is started up next time. This function, for example, saves user's trouble of reactivating the application program that was running at the time of shutdown when the information processing apparatus is started up, and, therefore, is highly convenient for users.

Further, some information processing apparatuses can be connected to a plurality of display apparatuses. This allows a user to work on a wider display area. Further, even many of laptop-type information processing apparatuses integrated with display units have connection units for further connection to external display apparatuses.

For example, Japanese Patent Application Laid-Open No. 2008-164988 discusses a multi-display system, in which an information processing apparatus is connected to a plurality of display apparatuses, and has a function of assigning application programs running on the information processing apparatus to the plurality of display apparatuses, thereby improving convenience for users.

However, according to the technique discussed in Japanese Patent Application Laid-Open No. 2008-164988, once an application program is set to be displayed on a connected display apparatus, the application program is always displayed on that display apparatus no matter what kind of apparatus that display apparatus is. This feature leads to a problem in that the application program is displayed even on a display apparatus on which the user does not want the application program to be displayed.

SUMMARY OF THE INVENTION

According to an aspect of the present invention, an information processing apparatus includes a first storing unit configured to store identification information of an output apparatus connected to the information processing apparatus, a second storing unit configured to store information indicating a display state at the time of a stop of a system of the information processing apparatus, a restoration unit configured to restore the display state of the information processing apparatus using the information stored by the second storing unit, and an acquisition unit configured to acquire identification information of an external output apparatus connected to the information processing apparatus in a case where the system is restarted after the stop of the system. The restoration unit limits restoration of the display state based on the identification information stored by the first storing unit and the identification information acquired by the acquisition unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 3 is a flowchart illustrating an example of display state restoration processing.

DESCRIPTION OF THE EMBODIMENTS

Various exemplary embodiments, features, and aspects of the invention will be described in detail below with reference to the drawings.

Figure 1:
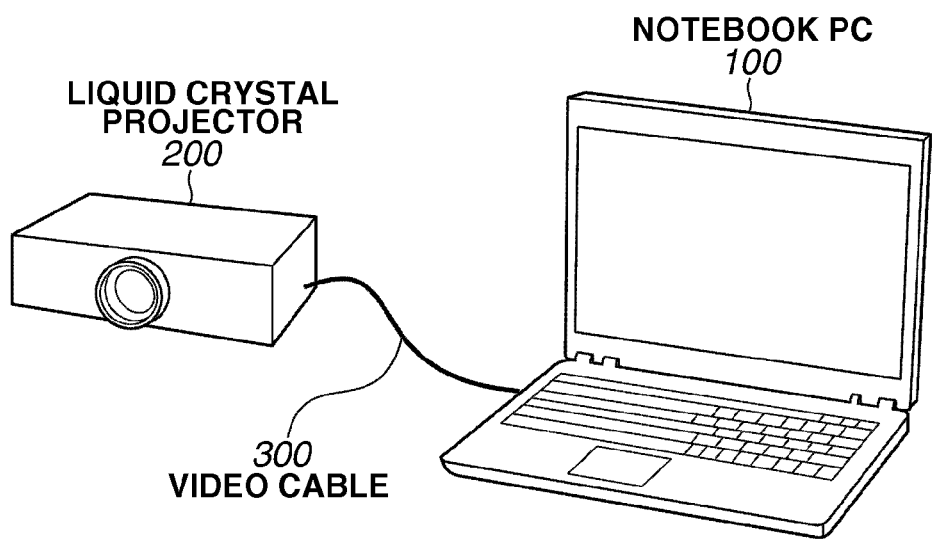
FIG. 1 illustrates an example of a system configuration of a display system according to an exemplary embodiment of the present invention.

FIG. 1 illustrates an example of a system configuration of a display system according to a first exemplary embodiment of the present invention. As illustrated in FIG. 1, the display system includes a notebook personal computer (PC) 100 and a liquid crystal projector 200. As illustrated in FIG. 1, the notebook PC 100 and the liquid crystal projector 200 are connected via a video cable 300. The notebook PC 100 is an example of an information processing apparatus. The liquid crystal projector 200 is an example of an external display apparatus.

Figure 2:
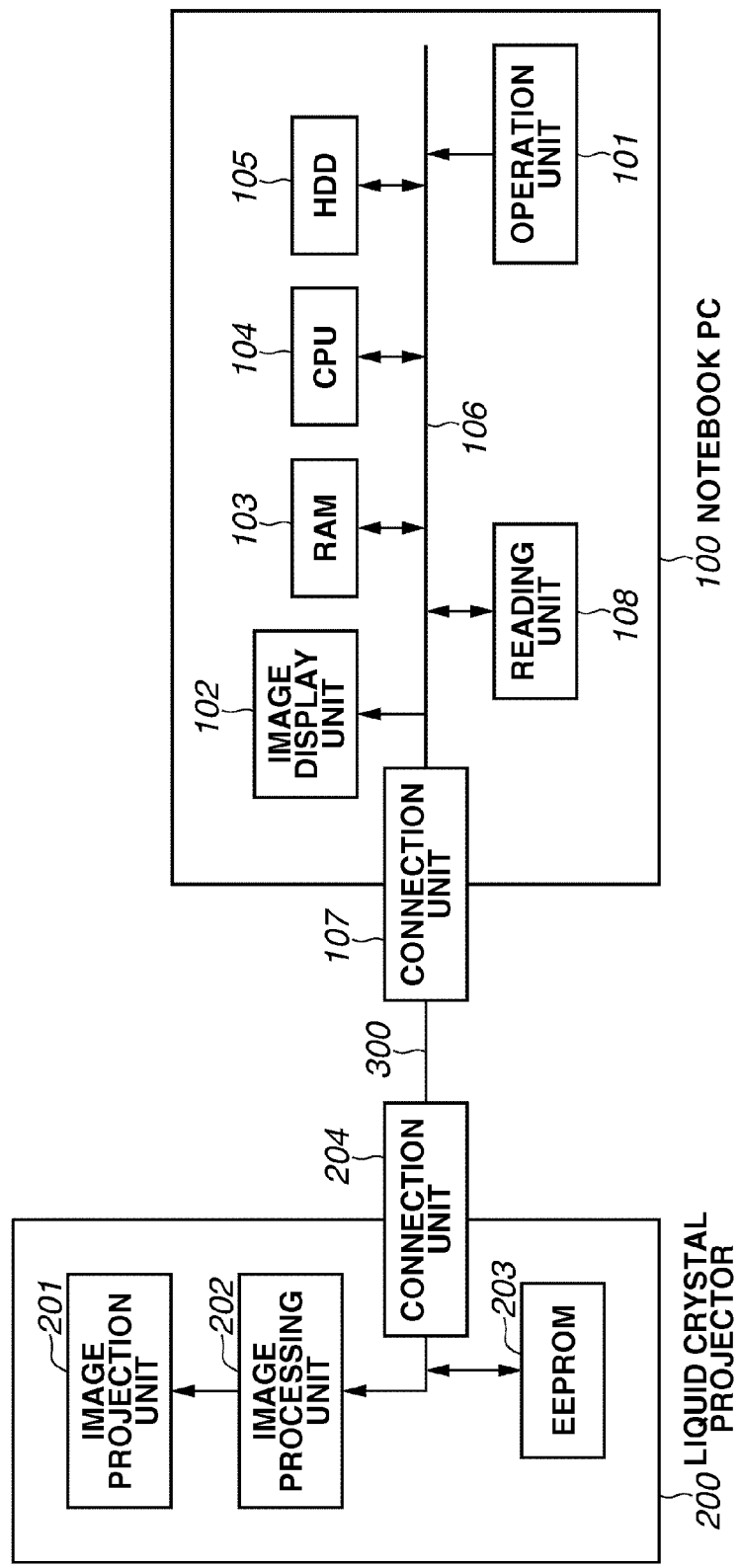
FIG. 2 illustrates an example of a hardware configuration of apparatuses included in the display system.

FIG. 2 illustrates an example of a hardware configuration of apparatuses included in the display system. The notebook PC 100 includes an operation unit 101, an image display unit 102, a random access memory (RAM) 103, a central processing unit (CPU) 104, a hard disk drive (HDD) 105, an internal bus 106, a connection unit 107, and a reading unit 108.

The operation unit 101 is a user interface such as a keyboard and a mouse pointer. The image display unit 102 is a liquid crystal display provided to the notebook PC 100, which displays an operation system (hereinafter referred to as "OS") and an application program window (hereinafter referred to as "application window"). The RAM 103 serves as a work memory, and also serves as an image RAM used by the CPU 104 in drawing processing. The CPU 104 reads out, for example, the OS and the application program from the HDD 105 to execute them, and draws the states of them on the image display unit 102.

The HDD 105 stores the OS and the application program executed by the CPU 104, and extended display identification data (EDID), which will be described below. The internal bus 106 is a bus enabling transmission/reception of data and commands within the notebook PC 100. The connection unit 107 is an interface for connection with an external display apparatus such as the liquid crystal projector 200. The reading unit 108 reads out the EDID, which includes specification information such as resolution, manufacturer information, and other information of the external display apparatus, from an electrically erasable programmable read-only memory (EEPROM) of the external display apparatus, which is connected to the notebook PC 100 via the connection unit 107.

The OS stored in the HDD 105 has a function of restoring the display state of an application window that was running at the time of the previous shutdown, when the notebook PC 100 is started up. The CPU 104 performs processing based on the program, thereby realizing processing according to the flowchart, which will be described below.

Next, a configuration of the liquid crystal projector 200 will be described. The liquid crystal projector 200 includes an image projection unit 201, an image processing unit 202, an EEPROM 203, and a connection unit 204.

The image projection unit 201 includes, for example, a light source, a liquid crystal panel, and a liquid crystal panel driver. The image projection unit 201 projects an input image. The image processing unit 202 performs image processing such as contrast processing and resolution conversion processing on an input image. The EEPROM 203 stores the above-described EDID. The connection unit 204 is a connection interface allowing the liquid crystal projector 200 to be connected to an information processing apparatus such as the notebook PC 100.

Figure 4A:
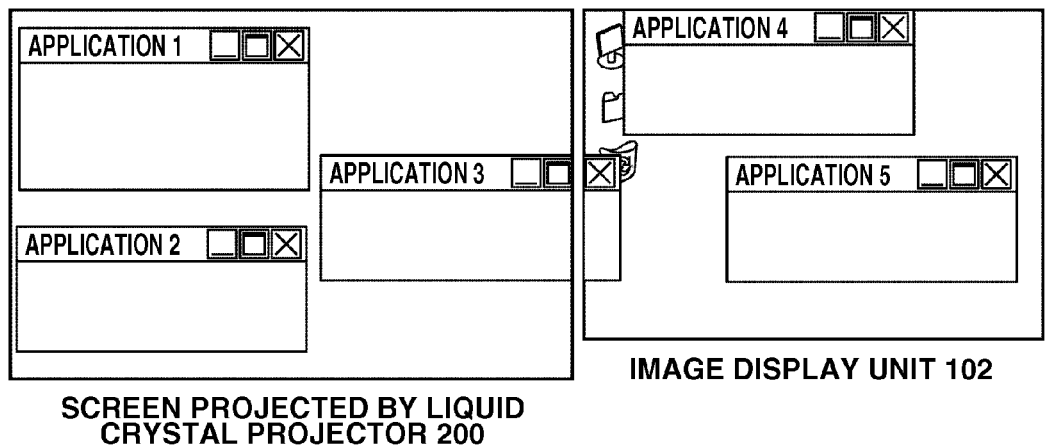
FIGS. 4Aa and 4Ab each illustrate an example of a screen configuration.
Figure 4A:
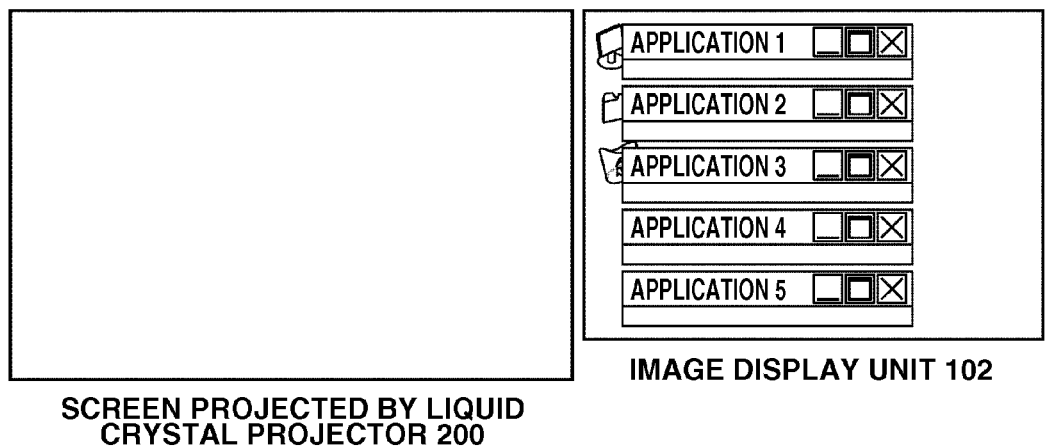

As illustrated in FIG. 4Aa, the present exemplary embodiment will be described as an example in which the image display unit 102 of the notebook PC 100 and the screen projected by the liquid crystal projector 200 are connected to provide an extended display.

Next, the control flow according to the present exemplary embodiment will be described with reference to a flowchart illustrated in FIG. 3. FIG. 3 is a flowchart illustrating an example of display state restoration processing. First, suppose that a user activates a plurality of applications after starting up the notebook PC 100, and operates them. In step S301, when the notebook PC 100 is started up, the CPU 104 reads out, via the reading unit 108, the EDID (hereinafter referred to as "PREV_EDID") stored in the EEPROM 203 of the liquid crystal projector 200 connected to the connection unit 107 and saves this EDID in the RAM 103.

FIG. 4Aa illustrates respective display areas of the image display unit 102 and the liquid crystal projector 200 immediately before the notebook PC 100 is shut down. FIG. 4Aa illustrates that application windows are displayed on the two display areas of the image display unit 102 and the liquid crystal projector 200. In step S302, when the user shuts down the notebook PC 100 in this state, the OS stores the EDID (PREV_EDID) saved in the RAM 103 and the display state of the application windows illustrated in FIG. 4Aa into the HDD 105.

In step S303, when the user restarts the notebook PC 100 after the shutdown of the notebook PC 100, the CPU 104 reads out the EDID (hereinafter referred to as "CURR_EDID") again from the EEPROM 203 via the reading unit 108. This processing is performed by using functions of the OS. Subsequently, in step S304, the CPU 104 compares the CURR_EDID with the PREV_EDID stored in the HDD 105 when the notebook PC was started up last time.

As a result of the comparison, if the CURR_EDID and the PREV_EDID are the same (YES in step S307), then in step S305, the CPU 104 restores the display state of the application windows, which was stored in the HDD 105 at the time of the shutdown, when the OS is started up. After the restoration display is performed, the screen of the image display unit 102 and the screen projected by the liquid crystal projector 200 display applications as illustrated in FIG. 4Aa. This is the same display state as the display state when the notebook PC 100 was shut down.

As a result of the comparison in step S304, if the CURR_EDID and the PREV_EDID are different (NO in step S307), then in step S306, the CPU 104 limits the restoration of the display state of the application windows, which were displayed at the time of the shutdown, when the OS is started up. For example, the CPU 104 allows the applications to be displayed only on the image display unit 102, as illustrated in FIG. 4Ab.

In this way, the restoration display of the application windows is controlled according to the result of the comparison between the EDID of the externally connected display apparatus at the time of the shutdown of the notebook PC 100 and the EDID of the externally connected display apparatus at the time of the restart of the notebook PC 100. Therefore, it is possible to securely or safely restore the display state of the application windows.

Figure 4B:
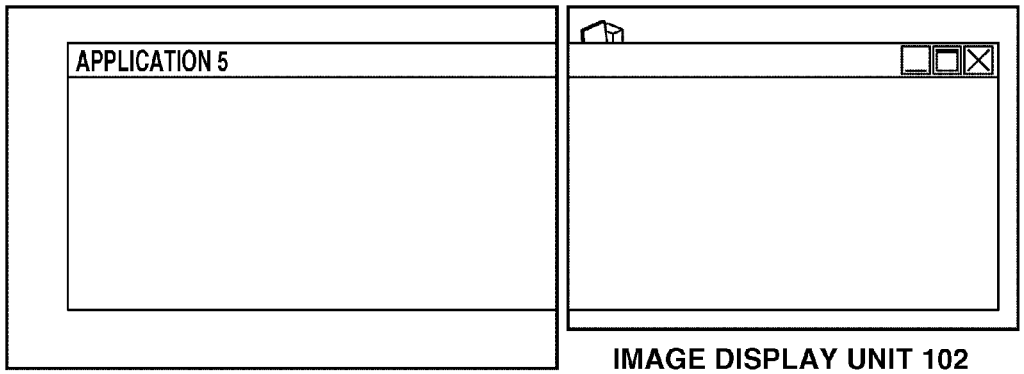
FIGS. 4Ba, 4Bb, and 4Bc each illustrate an example of a screen configuration.
Figure 4B:
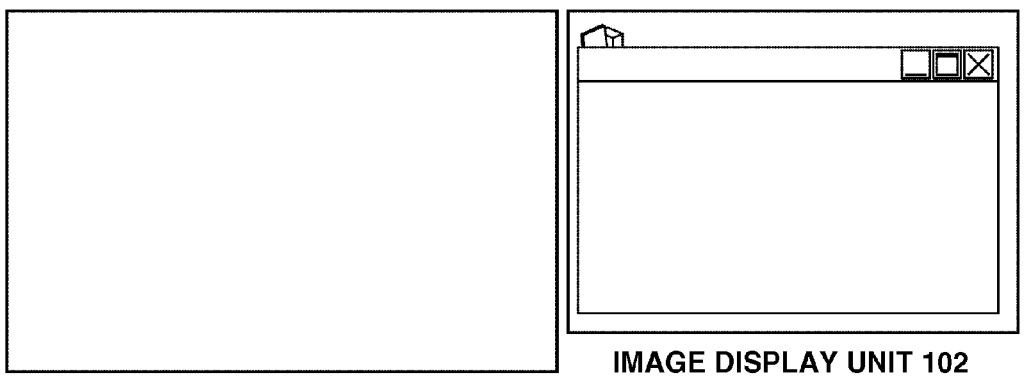
Figure 4B:
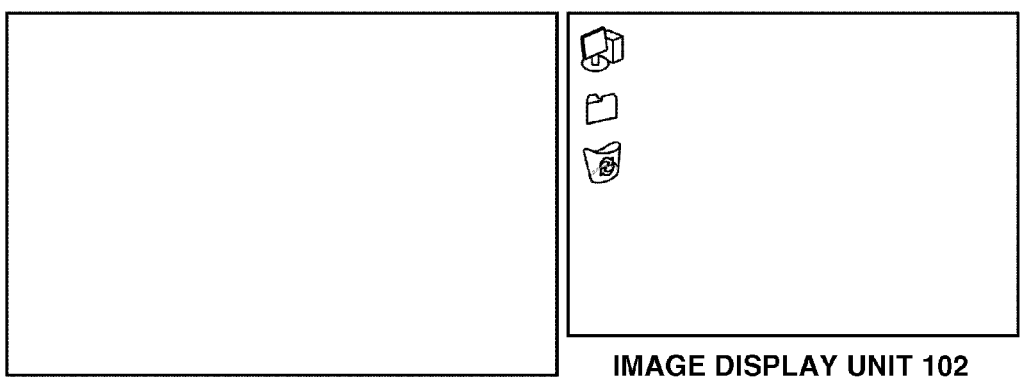

Further, FIG. 4Aa illustrates an example displaying a plurality of application windows. Alternatively, in a case where one application window is displayed across two display screens as illustrated in FIG. 4Ba, the application window may be displayed only on the image display unit 102 as illustrated in FIG. 4Bb.

Further, in the present exemplary embodiment, as the result of the comparison in step S304, if the CURR_EDID and the PREV_EDID are different (NO in step S307), the application windows are displayed only on the image display unit 102. Alternatively, the application windows may be prevented from being displayed completely, as illustrated in FIG. 4Bc.

Further, in the present exemplary embodiment, if the CURR_EDID and the PREV_EDID are different (NO in step S307), the restoration display is not performed. Alternatively, the OS may be provided with a function of allowing a user to select any of the settings of "DISPLAY APPLICATION WINDOWS ONLY ON NOTEBOOK PC", "DO NOT RESTORE DISPLAY STATE", and "ALWAYS RESTORE DISPLAY STATE".

Further, in the present exemplary embodiment, the restoration display is performed when the notebook PC 100 is shut down by way of example. Furthermore, the same processing as the processing at the time of the shutdown may be also performed at the time of recovery from a sleep state, a standby state, and a hibernation state of the OS, which enables the safe restoration of the display state of the application windows.

Further, in the present exemplary embodiment, the EDID read out in step S301 is stored in the HDD 105 at the time of the shutdown. However, the externally connected display apparatus may be changed during a period from a startup until a shutdown. Therefore, the EDID may be read out at the time of a shutdown again to be stored in the HDD 105.

Further, in the present exemplary embodiment, in step S306, the application windows are displayed only on the image display unit 102. At this time, as illustrated in FIG. 4Ca, a message window may be displayed to indicate to a user that all application windows are displayed only on the image display unit 102 to prevent a leak of information.

Figure 4C:
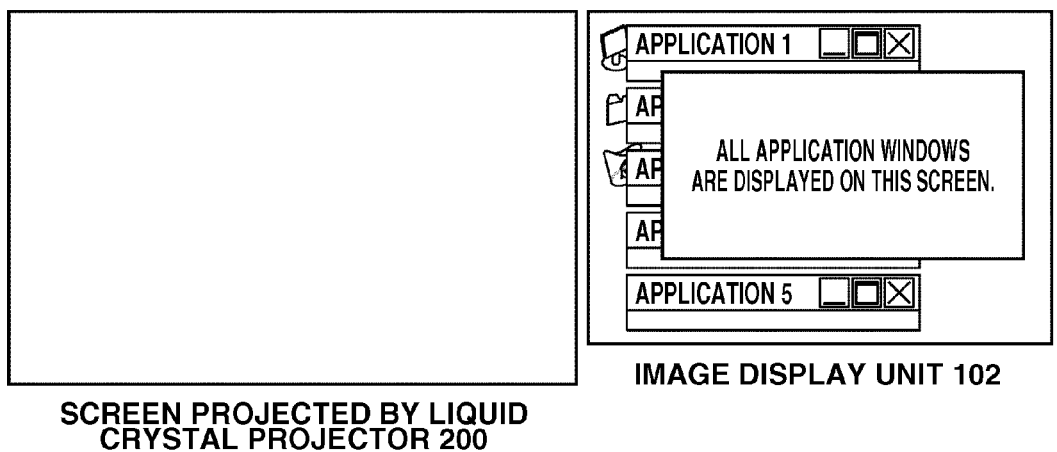
FIGS. 4Ca and 4Cb each illustrate an example of a screen configuration.
Figure 4C:
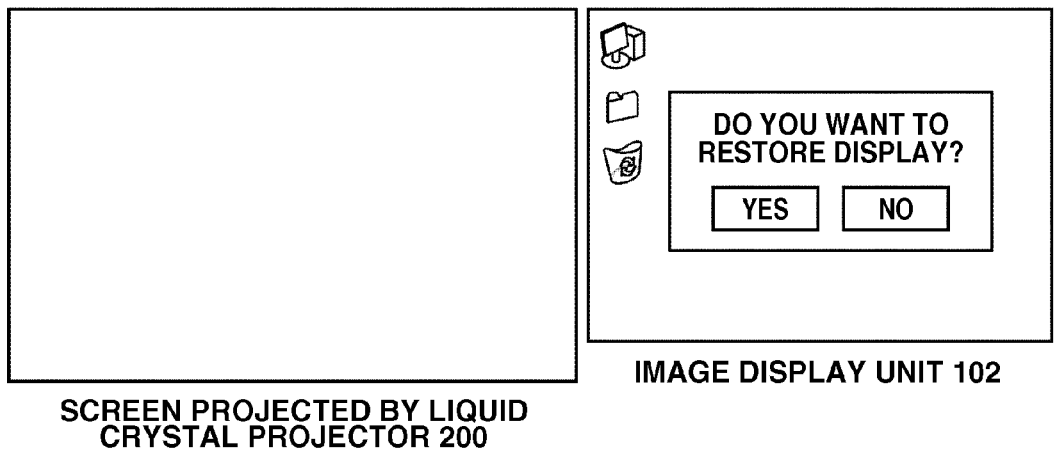

The CPU 104 may display a selection screen illustrated in FIG. 4Cb before performing the processing in step S306. In this case, the CPU 104 restores the display state when the user selects restoration on this selection screen (when the user selects "YES"), and displays the screens illustrated in FIG. 4Aa. The CPU 104 does not restore the display state of the application windows when the user does not select restoration (when the user selects "NO"). In other words, the CPU 104 displays the screens illustrated in FIG. 4Bc. Alternatively, the CPU 104 displays the screens where all application windows are displayed only on the image display unit 102, as illustrated in FIG. 4Ab.

Figure 5A:
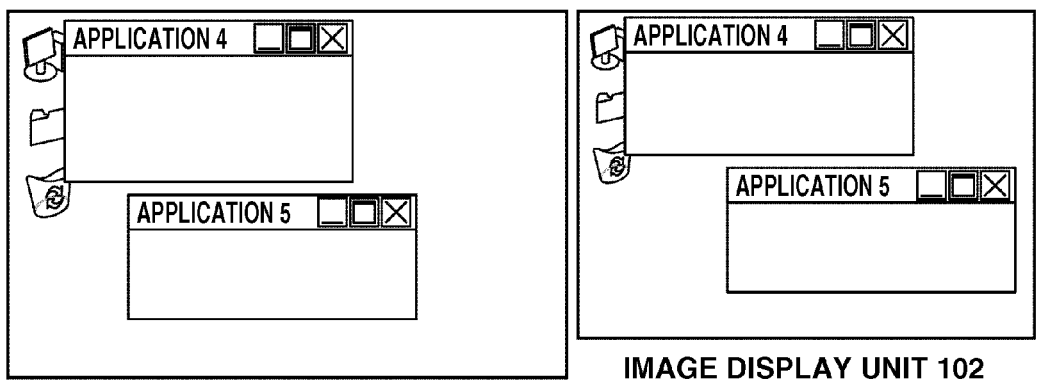
FIGS. 5A and 5B each illustrate an example of a screen configuration.

Next, a second exemplary embodiment of the present invention will be described with reference to FIGS. 5A and 5B. The notebook PC 100 and the liquid crystal projector 200 according to the present exemplary embodiment are configured in a similar manner to those according to the first exemplary embodiment, and, therefore, a description thereof is not repeated. The present exemplary embodiment will be described as an example in which the liquid crystal projector 200 performs a mirror display of the image display unit 102 of the notebook PC 100, as illustrated in FIG. 5A. The mirror display is a display to project the same screen as the image display unit 102 on the liquid crystal projector 200.

The processing flow is similar to the flow illustrated in the flowchart in FIG. 3, which has been described in the description of the first exemplary embodiment. In the present exemplary embodiment, if the CPU 104 determines that the EDID at the time of the restart is different from the EDID at the time of the shutdown, the CPU 104 stops the mirror display of the application windows. FIG. 5B illustrates screens in this case. As illustrated in FIG. 5B, the CPU 104 does not display the application windows on the liquid crystal projector 200, and displays the application windows only on the image display unit 102.

In this way, it is possible to safely restore the display state of the application windows by controlling the restoration display of the application windows according to the result of the comparison between the EDID of the externally connected display apparatus when the notebook PC 100 is shut down and the EDID of the externally connected display apparatus when the notebook PC is restarted.

Figure 5B:
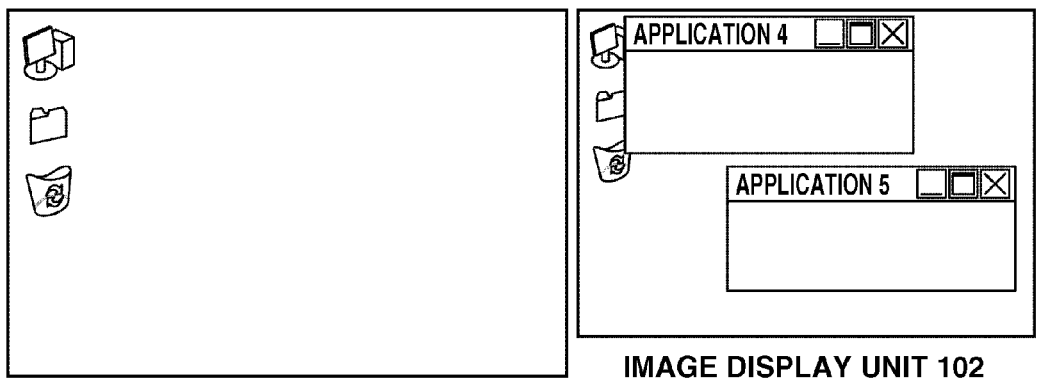

Further, in the present exemplary embodiment, the application windows are displayed only on the image display unit 102 as illustrated in FIG. 5B. However, the present exemplary embodiment is not limited to this display state. For example, as is the case with the first exemplary embodiment, the display state may be prevented from being restored completely. Alternatively, a selection screen may be displayed to ask a user whether the user wants to continue the mirror display.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent

What is claimed is:

1. An information processing apparatus for displaying a window of an application program on a first display device and an external display device, comprising:
    a memory device; and
    a processor connected to the memory device,
        wherein the memory device stores window information and first identification information, the window information being information on the window that was displayed on the first display device and the external display device when shutdown processing was performed, the first identification information being identification information of the external display device,
        wherein the first identification information was acquired from the external display device before completion of the shutdown processing by the information processing apparatus,
        wherein the processor acquires second identification information that indicates the external display device after restart processing by the information processing apparatus,
        wherein, in a case where the second identification information corresponds to the first identification information stored in the memory device, the processor causes the information processing apparatus to perform:
            processing of displaying, on the first display device, on the basis of the information stored in the memory device, the window that was displayed on the first display device when the shutdown processing was performed, and
            processing of presenting, to the external display device, on the basis of the information stored in the memory device, the window that was displayed on the external display device when the shutdown processing was performed, and
        wherein, in a case where the second identification information does not correspond to the first identification information stored in the memory device, the processor performs:
            control of not displaying, on the external display device, on the basis of the information stored in the memory device, the window that was displayed on the external display device when the shutdown processing was performed, and
            control of displaying, on the first display device, on the basis of the information stored in the memory device, the window that was displayed on the first display device when the shutdown processing was performed and the window that was displayed on the external display device when the shutdown processing was performed.

2. The information processing apparatus according to claim 1,
    wherein, in a case where the second identification information does not correspond to the first identification information stored in the memory device, a selection screen that allows a user to select whether to restore window display of the application program or not is displayed on the first display device.

3. The information processing apparatus according to claim 1, wherein the information processing apparatus operates as a personal computer.

4. The information processing apparatus according to claim 1, wherein the external display device operates as a projector.

5. The information processing apparatus according to claim 1, wherein the memory device is implemented by hardware.

6. A method for displaying a window of an application program on a first display device and an external display device, comprising:

storing, in a memory device, window information and first identification information, the window information being information on the window that was displayed on the first display device and the external display device when shutdown processing was performed, the first identification information being identification information of the external display device, wherein the first identification information was acquired from the external display device before completion of the shutdown processing by the information processing apparatus, acquiring, by a processor, second identification information that indicates the external display device after restart processing by the information processing apparatus, wherein, in a case where the second identification information corresponds to the first identification information stored in the memory device, the processor causes the information processing apparatus to perform:

processing of displaying, on the first display device, on the basis of the information stored in the memory device, the window that was displayed on the first display device when the shutdown processing was performed, and processing of presenting, to the external display device, on the basis of the information stored in the memory device, the window that was displayed on the external display device when the shutdown processing was performed, and wherein, in a case where the second identification information does not correspond to the first identification information stored in the memory device, the processor performs:

control of not displaying, on the external display device, on the basis of the information stored in the memory device, the window that was displayed on the external display device when the shutdown processing was performed, and control of displaying, on the first display device, on the basis of the information stored in the memory device, the window that was displayed on the first display device when the shutdown processing was performed and the window that was displayed on the external display device when the shutdown processing was performed.

7. The method according to claim 6, wherein, in a case where the second identification information does not correspond to the first identification information stored in the memory device, a selection screen that allows a user to select whether to restore window display of the application program or not is displayed on the first display device.

8. The method according to claim 6, wherein the information processing apparatus operates as a personal computer.

9. The method according to claim 6, wherein the external display device operates as a projector.

10. The method according to claim 6, wherein the memory device is implemented by hardware.

11. A non-transitory computer-readable medium storing a computer-executable process, the computer-executable process allowing a computer to execute a method for displaying a window of an application program on a first display device and an external display device, comprising:

storing, in a memory device, window information and first identification information, the window information being information on the window that was displayed on the first display device and the external display device when shutdown processing was performed, the first identification information being identification information of the external display device, wherein the first identification information was acquired from the external display device before completion of the shutdown processing by the information processing apparatus, acquiring, by a processor, second identification information that indicates the external display device after restart processing by the information processing apparatus, wherein, in a case where the second identification information corresponds to the first identification information stored in the memory device, the processor causes the information processing apparatus to perform:

processing of displaying, on the first display device, on the basis of the information stored in the memory device, the window that was displayed on the first display device when the shutdown processing was performed, and processing of presenting, to the external display device, on the basis of the information stored in the memory device, the window that was displayed on the external display device when the shutdown processing was performed, and wherein, in a case where the second identification information does not correspond to the first identification information stored in the memory device, the processor performs:

control of not displaying, on the external display device, on the basis of the information stored in the memory device, the window that was displayed on the external display device when the shutdown processing was performed, and control of displaying, on the first display device, on the basis of the information stored in the memory device, the window that was displayed on the first display device when the shutdown processing was performed and the window that was displayed on the external display device when the shutdown processing was performed.

12. The computer-readable medium according to claim 11, wherein, in a case where the second identification information does not correspond to the first identification information stored in the memory device, a selection screen that allows a user to select whether to restore window display of the application program or not is displayed on the first display device.

13. The computer-readable medium according to claim 11, wherein the information processing apparatus operates as a personal computer.

14. The computer-readable medium according to claim 11, wherein the external display device operates as a projector.

15. The computer-readable medium according to claim 11, wherein the memory device is implemented by hardware.

* * * * *